United States Patent [19]

Miller et al.

[11] Patent Number: 4,779,931

[45] Date of Patent: Oct. 25, 1988

[54] SAFETY SUPPORT AND STOP ASSEMBLY

[76] Inventors: Ralph E. Miller, 1024 N.W. 28th; Randall J. Miller, 1108 Cottonwood Dr., both of Moore, Okla. 73160

[21] Appl. No.: 63,499

[22] Filed: Jun. 18, 1987

Related U.S. Application Data

[63] Continuation-in-part of Ser. No. 875,758, Jun. 16, 1986.

[51] Int. Cl.⁴ ................................................. B60P 1/04
[52] U.S. Cl. .................................... 298/17 B; 248/351
[58] Field of Search ........................... 298/17 R, 17 B; 248/351, 357

[56] References Cited

U.S. PATENT DOCUMENTS

| | | | |
|---|---|---|---|
| 1,392,615 | 10/1921 | Anthony | 298/17 B X |
| 2,082,139 | 6/1937 | Bassetti | 298/17 B X |

FOREIGN PATENT DOCUMENTS

| | | | |
|---|---|---|---|
| 58-101834 | 6/1983 | Japan | 298/17 B |
| 58-101833 | 6/1983 | Japan | 298/17 B |
| 58-136527 | 8/1983 | Japan | 298/17 B |
| 58-141942 | 8/1983 | Japan | 298/17 B |

*Primary Examiner*—Leslie J. Paperner
*Attorney, Agent, or Firm*—Glen M. Burdick

[57] ABSTRACT

A safety support and stop assembly for securing a dump body pivotally mounted on a truck chassis frame in an elevated position above the chassis frame so as to permit a mechanic to work safely on components of the truck while the dump bed is in the elevated position. The safety support and stop assembly comprises an upright support member, a cradle support assembly and a base assembly. The upright support member is characterized as having an upper bed engaging support end and a lower pivot end. The lower pivot end is pivotally connected to the cradle support assembly such that the upright support member is disposed in a selectable angular disposition relative to the truck chassis frame. The base assembly, which is removably supported on the truck chassis frame, supports the cradle assembly at a preselected position along the truck chassis frame.

10 Claims, 2 Drawing Sheets

SAFETY SUPPORT AND STOP ASSEMBLY

CROSS REFERENCE TO RELATED APPLICATION

This is a continuation-in-part application of U.S. patent application Ser. No. Des. 875,758, entitled UNIVERSAL SAFETY BLOCKS FOR DUMP TRUCKS, filed June 16, 1986 and now pending.

BACKGROUND OF THE INVENTION

1. Field of the Invention

The present invention relates generally to truck safety apparatus, and more particularly, but not by way of limitation, to a safety support and stop assembly for securing a dump body of a truck in an elevated position above the truck chassis frame.

2. Description of the Prior Art

Trucks having a dump body pivotally mounted on a chassis-cab are commonly referred to as "dump trucks". In the conventional dump truck the dump body is located on the chassis frame rearward of the cab so that the front end of the dump bed can be selectively raised and lowered with respect to a rearward pivot point. When it is necessary for a mechanic or other laborer to work on various mechanisms of the dump truck, such as the drive shaft, various brake lines, the hoist, and the like, the dump body must generally be raised so that the mechanic can work thereunder and have access to the mechanisms being repaired or replaced.

In many instances the mechanic is required to lean over the chassis frame which places the mechanic's body in a dangerous position between the chassis frame and the dump body should the dump body descend unexpectedly. As a result, serious injuries and even death have resulted when the dump body accidentally descends from the dumping or raised position to a horizontal position. Because of the precarious position that the mechanic is often placed in while working on various mechanisms of the truck when the dump bed is in a raised position, it has become common knowledge among trained mechanics that the dump body should be blocked or propped when servicing or repairing the truck and the dump body is in the raised position. Various means have heretofore been proposed to block the dump body in a raised position, such as the use of large wood planks located at the pivot point to prevent unexpected decent of the dump body, or the use of an elongated wood planks or metal props to brace the body from its front end rather than at its pivot point.

In addition to the before-mentioned methods of bracing the dump body in the raised position, several dump body brace assemblies have been proposed by the prior art. Typical of such safety block mechanisms are disclosed in U.S. Pat. Nos. 4,138,158 (issued Feb. 6, 1979), 4,372,614 (issued Feb. 8, 1983), 2,427,381 (issued Sept. 16, 1947), 3,813,124 (issued May 28, 1974), 4,218,094 (issued Aug. 8, 1980) and 4,305,619 (issued Dec. 15, 1981).

While each of the before-mentioned mechanisms have met with some success in preventing the dump body of a truck from dropping inadvertently and accidentally from its dumping position to a horizontal position on the truck frame, the need has still remained for an improved assembly which does not require modification to the truck and lends itself more readily to the mechanic and the mechanic's use of such assembly in propping the dump bed in the elevated or dumping position. It is to such an assembly that the present invention is directed.

SUMMARY OF THE INVENTION

The present invention provides a safety support and stop assembly for securing a dump body pivotally mounted on a truck chassis frame in an elevated position above the chassis frame so as to permit a mechanic to work safely on components of the truck. Broadly, the safety support and stop assembly comprises an upright support member, a cradle support assembly and a base assembly. The upright support member is characterized as having an upper bed engaging support end and a lower pivot end. The lower pivot end is pivotally connected to the cradle support assembly such that the upright support member is disposed in a selectable angular disposition relative to the truck chassis frame. The base assembly, which is removably supported on the truck chassis frame, supports the cradle assembly at a preselected position along the truck chassis frame. Thus, when the support and stop assembly is positioned on the chassis frame and the dump bed lowered for engagement with the upper bed engaging support end of the upright member, the dump bed is stabilized in a spatial relationship relative to the truck chassis frame by the safety support and stop assembly.

An object of the present invention is to provide a safety support and stop assembly for securing a dump body in an elevated position above the chassis frame.

Another object of the present invention, while achieving the before stated object, is to provide a safety support and stop assembly positionable between the chassis frame and the dump body of a truck so as to prevent inadvertent and accidental dropping of the dump body from its raised or dumping position to a horizontal position on the truck frame.

Another object of the present invention, while achieving the above stated objects, is to provide a safety support and stop assembly for use in securing a dump bed of a truck in an elevated position which is easy to use, durable in construction and economical to manufacture.

Other objects, advantages and features of the present invention will become clear from the following detailed description when read in conjunction with the drawings in the appended claims.

DETAILED DESCRIPTION

Figure 1:
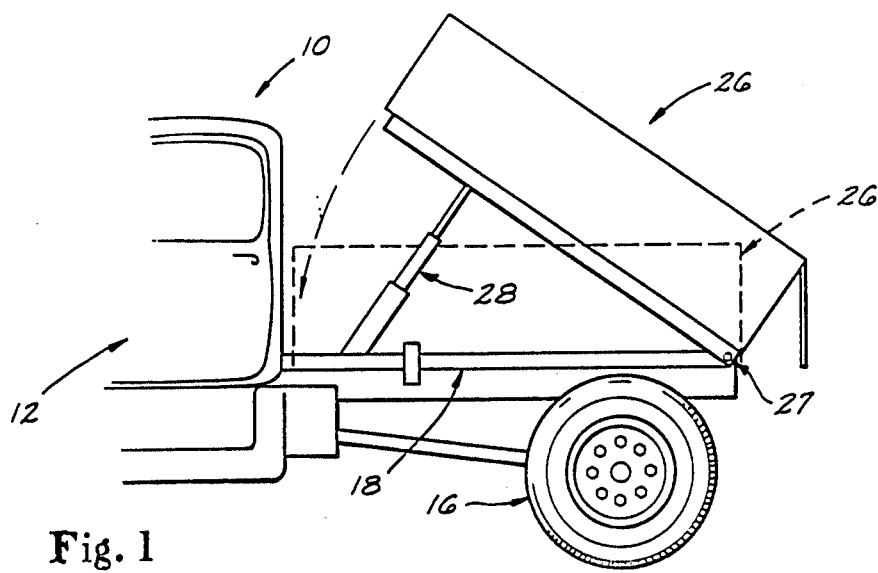
FIG. 1 is a side elevational view of a truck having a dump body, the dump body being shown in an elevated raised position, and in a lowered position by phantom lines.

Referring now to the drawings, and more particularly to FIG. 1, illustrated therein is a dump truck 10. The dump truck 10 includes a cab and engine assembly 12, a front axial and wheel (not shown), a rear axial and wheel 16 and a longitudinally extending frame or chassis 18. The chassis 18 is constructed of conventional iron beams, such as the longitudinally extending frame members 20 and 22, and at least one transversely extending frame member 24 extending between and interconnecting the frame members 20 and 22.

A dump body 26 is pivotally secured to the chassis 8 by a pivot 27 such that the dump body 26 can be selectively moved between a raised position and a lowered position. In the raised position the load can be discharged from the dump body 26 in a conventional manner; whereas in a lowered position (indicated by phantom lines in FIG. 1) the dump body 26 is supported on the chassis 18 so as to be generally horizontally disposed. The dump body 26 is selectively moved between the raised and lowered positions by actuation of a hydraulic assembly, generally represented by the numeral 28.

The dump truck 10 described above is of conventional construction. Thus, no further description of the dump truck 10 is believed necessary in order for one to fully understand the subject invention as will now be described with reference to FIGS. 2-6 of the drawings.

Figure 2:
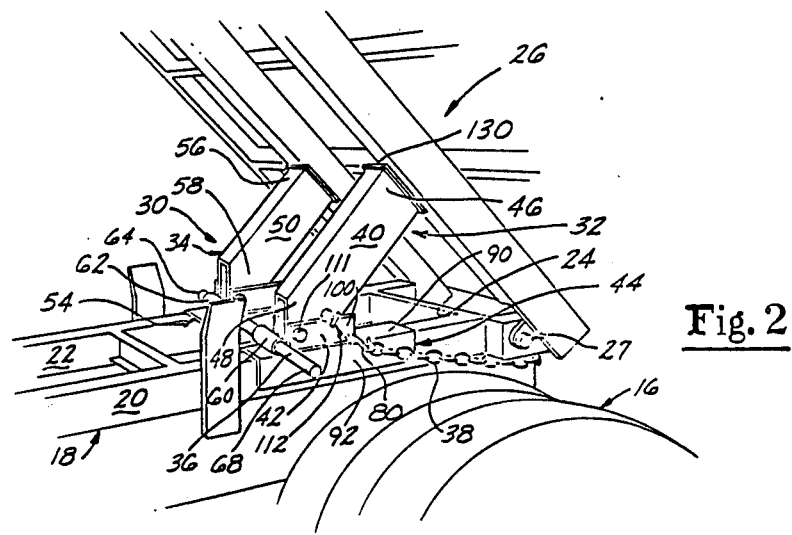
FIG. 2 is a partial perspective view of a portion of the dump truck of FIG. 1 having the safety support and stop assembly of the present invention in place for securing the dump body in a raised position.

When repairs are made to certain components of the dump truck 10 located under the dump body 26, such as to the drive shaft, certain brake lines, the hydraulic assembly and the like, the dump body 26 must be raised so that the mechanic will have access to the components to be replaced or repaired. As illustrated in FIG. 2, in order for the mechanic to have access to such component it is generally necessary that the dump body 26 be moved to its raised position. To secure the dump body 26 in its raised position, even when the hydraulic assembly 28 is deactivated or rendered in-operative, and to permit the mechanic to safely work under the raised dump body 26, a safety support and stop assembly 30 constructed in accordance with the present invention can be positioned and stabilized on the longitudinally extending frame members 20 and 22 of the chassis 18. The safety support and stop assembly 30 engages and supports the dump body 26 in a stable, raised position and prevents the inadvertent dropping of the dump body 26.

The safety support and stop assembly 30 comprises a pair of support and stop units 32, 34. To secure the dump body 26 in the raised position (as illustrated in FIG. 1), the dump body 26 is moved to the raised position by actuation of the hydraulic assembly 28. Once the dump body 26 has been moved to the raised position, the support and stop unit 32 is positioned on the frame member 20; and the support and stop unit 34 is positioned on the frame member 22. The position of the support and stop units 32 and 34 on the frame members 20, 22 depends on the elevation of the dump body 26 required to permit the mechanic to have access to the components of the dump truck 10 to be repaired or replaced. The support and stop units 32, 34 are positioned in the desired position so as to be substantially aligned and evenly support the dump body 26.

To secure the support and stop units 32, 34 on the frame members 20, 22 (and to prevent lateral movement of support and stop units 32, 34 as the dump body 26 is lowered into engagement with the support and stop units 32, 34), the support and stop units 32, 34 are interconnected with a connecting member 36. By connecting the support and stop units 32, 34 with the connecting member 36, the support and stop units 32, 34 are maintained in a predetermined spatial relationship.

Further, to prevent movement of the support and stop units 32, 34 along the longitudinal axis of the frame members 20 and 22 as the dump body 26 is lowered to the engaging position with the support and stop units 32, 34, the support and stop units 32, 34 are secured to the chassis 18 via a chain member 38. The chain member 38 is connected to the support and stop units 32 and 34, and positioned around a portion of the chassis 18, such as the transversely disposed frame member 24 illustrated in FIG. 2. Thus, the combination of the chain member 38 and the transversely disposed frame member 24 prevents movement of the support and stop units 32, 34 along the frame members 20 and 22 as the dump body 26 is lowered into an engaging position with the support and stop units 32, 34.

The support and stop unit 32 comprises an upright support member 40, a cradle support assembly 42, and a base assembly 44. The upright support member 40 is characterized as having an upper body engaging support end 46 and a lower pivot end 48. The lower pivot end 48 of the upright support member 40 is pivotally connected to and supported by the cradle support assembly 42 such that the upright support member 40 is disposed in a selectable angular disposition relative to the frame member 20 of the chassis 18. That is, the upright support member 40 is fabricated such that upon pivotally connecting the upright support member 40 to the cradle support assembly 42, the upright support member 40 and thus the upper body engaging support end 46 thereof, are selectively and angularly disposed such that the upper body engaging support end 46 engages and supports the dump body 26 in the desired position above the chassis 18 substantially as shown in FIG. 2.

The base assembly 44 is desirably fabricated of L-shaped angle iron so that the base assembly 44 can be readily positioned on the frame member 20 of the chassis 18. The base assembly 44 is connected to the cradle support assembly 42 such that the cradle support assembly 42, and thus the upright support member 40, are positionable on the frame member 20 at a selected position dependent on the desired elevation at which the dump body 26 is to be secured and supported by the support and stop units 32 and 34.

The support and stop unit 34 also comprises an upright support member 50, a cradle support assembly 52 and a base assembly 54. The upright support member 50 is characterized as having an upper body engaging support end 56 and a lower pivot end 58. The lower pivot end 58 of the upright support member 50 is pivotally connected to and supported by the cradle support assembly 52 such that the upright support member 50 is disposed in a selectable angularly disposition relative to the frame member 22 of the chassis 18. That is, the upright support member 50 is fabricated such that upon pivotally connecting of the upright support member 50 to the cradle support assembly 52, the upright support member 50 and thus the upper body engaging support end 56 thereof, are selectively and angularly disposed such that the upper body engaging support end 56 engages and supports the dump body 26 in the desired position above the chassis 18 substantially as shown in FIG. 2.

The base assembly 54 is desirably fabricated of L-shaped angle iron so that the base assembly 54 can be readily positioned on the frame member 22 of the chassis 18. The base assembly 54 is connected to the cradle support assembly 52 such that the cradle support assembly 52, and thus the upright support member 50, are positionable on the frame member 22 at a selected position dependent on the desired elevation at which the dump body 26 is to be secured and supported by the support and stop units 32 and 34. As previously stated, in order to provide even load distribution of the dump body 26 on the support and stop units 32 and 34, the support and stop units 32 and 34 are substantially aligned and parallel with each other on their respective supporting frame members 20, 22 of the chassis 18.

The support and stop units 32 and 34 further comprise collar members 60 and 62, respectively, supported on their respective base assemblies 44 and 54. The collar members 60 and 62 are adapted to receive the connecting member 36 such that the support and stop units 32 and 34 can be secured in a stable, parallel, spatially disposed position on the frame members 20 and 22 of the chassis 18. That is, when the support and stop units 32 and 34 are positioned on the frame members 20 and 22 and interconnected by positioning and securing the connecting member 36 to the collar members 60 and 62, undesired lateral movement of the support and stop units 32 and 34 is prevented as the dump body 26 is lowered into an engaging position with the upper body engaging support ends 46 and 56 of the upright support members 40 and 50.

Figure 3:
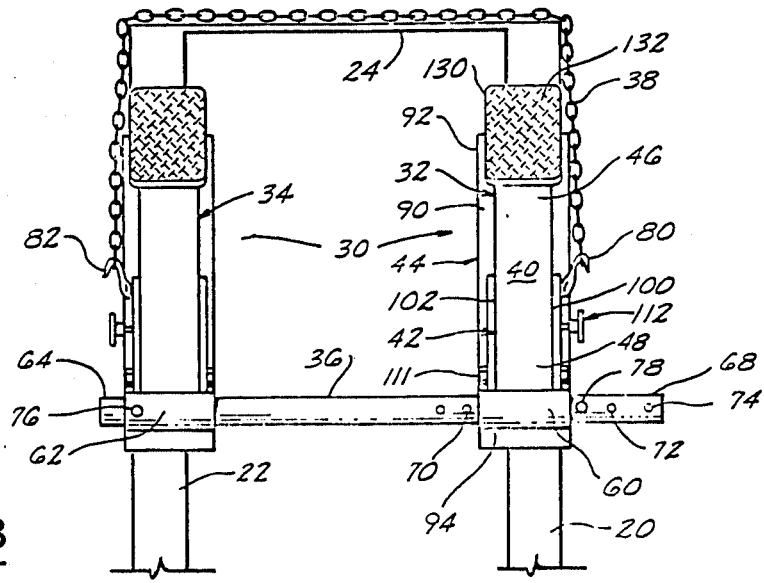
FIG. 3 is a top plan view of the safety support and stop assembly of the present invention positioned on a chassis of the dump truck.

The connecting member 36 used to interconnect the support and stop units 32, 34 so as to prevent lateral movement thereof as a dump body 26 is lowered into engagement with the upper body engaging support ends 46, 56 of the support and stop units 32, 34, respectively, is fabricated of a length greater than the distance between the frame members 20 and 22 supporting the support and stop units 32, 34. One end 64 of the connecting member 36 is provided with a bore therein (not shown) alignable with an aperture (also not shown) disposed within the collar member 62; and an opposed second end 68 of the connecting member 36 is provided with a plurality of aligned bores, such as bores 70, 72 and 74 extending therethrough. Thus, in an assembled position the connecting member 36 is positioned through the collar members 60 and 62 and the bore (not shown) in the end 64 thereof is aligned with the aperture (not shown) in the collar member 62 such that a pin 76 can be positioned therein to secure the one end 64 of the connecting member 36 within the collar member 62. The opposed second end 68 of the connecting member 36 extends through the collar member 60 such that a pin 78 can be positioned in one of the apertures substantially adjacent an outside portion of the collar member 60 as shown in FIG. 3. By providing the connecting member 36 with a length greater than the width or distance between the frame members 20 and 22, the versatility of the support and stop assembly 30 for a wide range of vehicles can readily be seen.

The support and stop unit 32 further comprises a hook member 80 supported on the cradle support assembly 42; and the support and stop unit 34 further comprises a hook member 82 supported on the cradle support assembly 52. The hook members 80 and 82 are adapted to receive and engage the chain member 38. Thus, when the support and stop units 32 and 34 are positioned on the frame members 20 and 22, and the chain member 38 is disposed around a frame member of the chassis 18, such as the frame member 24 illustrated in FIG. 2, the chain member 38 and the hook members 80 and 82 cooperated to stabilize the support and stop units 32 and 34. By connecting the chain member 38 to a frame member of the chassis 18, and thereafter securing one end portion of the chain member 38 to the hook member 80 and the other end portion of the chain member 38 to the hook member 82, the support and stop units 32 and 34 are prevented from slidingly moving along the frame members 20 and 22 as the dump body 26 is lowered into engaging contact with the upper body engaging support ends 46, 56 of the upright support members 40, 50, respectively.

With the exception of the aperture (not shown) disposed within the collar member 62 of the support and stop unit 34, the support and stop units 32 and 34 are identical in construction and mirror images of each other. Thus, only support and stop unit 32, and the components thereof, will be described hereinafter with reference to FIGS. 4–6.

As previously stated, the base assembly 44 is desirably fabricated of L-shaped angle iron. As such, the base assembly 44 is characterized as having a first or upper side 90 and a normally disposed second side 92. The upper side 90 of the base assembly 44 is disposed adjacent and supported by a portion of the upper side of the frame member 20 such that the second side 92 is disposed adjacent a portion of an exterior side of the frame member 20. The collar member 60 is connected to and supported on the upper side 90 of the base assembly 44; and the collar member 60 is disposed substantially adjacent one end 94 of the upper side 90. The cradle support assembly 42 is supported by and connected to the upper side 90 of the base assembly 44 so as to be disposed adjacent the collar member 60 substantially as shown. Any suitable means can be employed for securing the collar member 60 and the cradle support assembly 42 to the upper side 90 of the base assembly 44, such as welding.

The cradle support assembly 42 comprises a pair of parallel, spatially disposed upright members 100, 102, and an angularly disposed end plate member 104. The upright members 100, 102 define a cradle 106 for receiving the lower pivot end 48 of the upright support member 40. Thus, when the upright member 40 is pivotally connected to the upright members 100 and 102, the upright support member 40 is provided with pivotal motion in a to and from direction corresponding with the longitudinally axis of the frame member 20. The end plate 104, which is angularly disposed and serves as a stop for the movement of the upright support member 40, is secured to the upright members 100 and 102 via their respective end portions 101 and 103 substantially as shown. The upright members 100 and 102 are each provided with an aligned apertures 108, 110 therein adapted to receive a pivot pin 111 for pivotally connecting the lower pivot end 48 of the upright support member 40 to the upright members 100, 102 of the cradle support assembly 42.

To secure the upright support member 40 in a stable, angularly disposed position relative to the cradle support assembly 42, and thus the upper side 90 of the base assembly 44, a lock assembly 112 is supported by the upright member 100. The lock assembly 112 comprises a body portion 114 having a threaded aperture (not shown) extending therethrough. The threaded aperture is adapted to receive a bolt member 118 such that upon threadably moving the bolt member 118 through the threaded aperture a distal end 120 of the bolt member 118 engages the upright support member 40 and secures the upright support member 40 in a locked, stable position relatively to the cradle support assembly 42.

Figure 4:
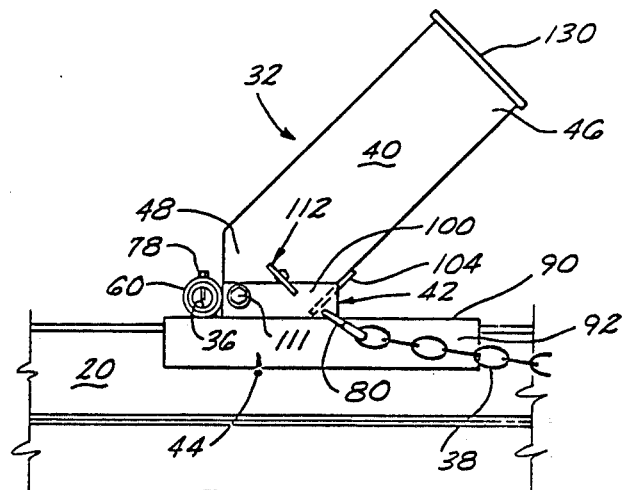
FIG. 4 is a side elevational view of the safety support and stop assembly located on a horizontal frame member of the chassis of the dump truck.
Figure 5A:
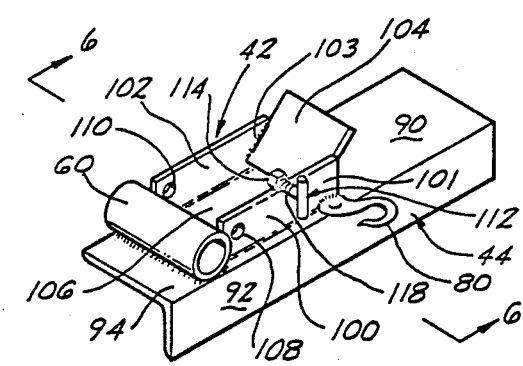
FIG. 5A is a perspective view of a cradle support and base member of the safety support and stop assembly of the present invention.
Figure 5B:
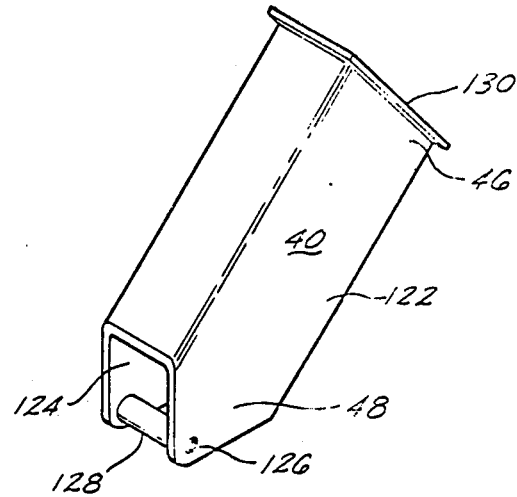
FIG. 5B is a perspective view of an upright support member of the safety support and stop assembly of the present invention.
Figure 6:
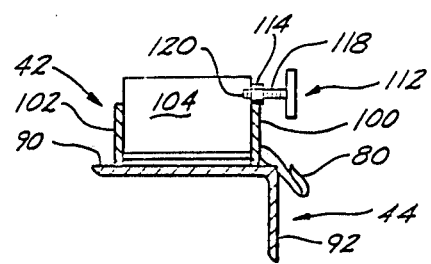
FIG. 6 is a view of the cradle support and base member of FIG. 5A taken along the lines 6—6.

The lower pivot end 48 of the upright support member 40 is formed of generally triangular configuration so as to assist in the pivotal movement of the upright support member 40 in the cradle support assembly 42, and to insure the desired angular disposition of the upper body engaging support end 46 of the upright support member 40. The lower pivot end 48 is provided with a pair of aligned apertures in spatially disposed side walls 122, 124 thereof, only aperture 126 in side wall 122 being shown. A reinforcing sleeve 128 is disposed between the side walls 122 and 124 so as to be aligned with the apertures formed therein substantially as shown in FIG. 5B. Thus, the reinforcing sleeve 128 is adapted to receive the pivot pin 111 for pivotally connecting the upright support member 40 to the cradle support assembly 42 substantially as shown in FIG. 4.

The upright support member 40 illustrated in FIG. 5B has been illustrated as being fabricated of four sides including a medial portion having a substantially rectangular cross-sectional configuration. However, it is to be understood that any suitable configuration can be employed for the upright support member 40, provided the configuration permits the upright support member 40 to cooperate with the cradle support assembly 42 to function in the manner herein set forth to support and engage the dump body 26 and maintain the dump body 26 in a predetermined angular position above the chassis 18 of the dump truck 10. Further, the upper body engaging support end 46 of the upright support member 40 is depicted as having a support plate 130 secured thereto. The support plate 130 can be provided with a non-skid surface 132 to improve contact of the dump body 26 with the support plate 130, and thus the upright support member 40.

In employing the safety support and stop assembly 30 of the present invention the dump body 26 of the dump truck 10 is moved to the raised position. Thereafter, the support and stop unit 32 is positioned on the frame member 20; and the support and stop unit 34 is positioned on the frame member 22. The support and stop units 32 and 34 are aligned so as to be parallel disposed. The connecting member 36 is then positioned through the collar members 60 and 62 of the support and stop units 32, 34 and secured in place by positioning of the pins 76 and 78 in the appropriate apertures of the connecting member 36 and the aperture in the collar member 60. The chain member 36 is connected to hook member 80 of the support and stop unit 32 and positioned around a frame member of the dump truck 10, such as the frame member 24. The free end of the chain member 38 is then secured to the hook member 82 of the support and stop member 34. Thus, the interconnection of the support and stop units 32 and 34 by the connecting member 36 and the chain member 38 stabilizes the support and stop units 32, 34 on the frame members 20, 22 of the chassis 18; and such use of the connecting member 36 and the chain member 38 prevents either lateral or longitudinal movement of the support and stop units 32 and 34 relative to the frame members 20 and 22 as the dump body 26 is lowered into engaging contact with the support and stop units 32, 34.

The safety support and stop assembly 30 of the present invention can be fabricated of any material having sufficient strength to support the dump body 26 in an elevated position. However, desirable results have been obtained wherein the base assembly of the support and stop unit is fabricated of an angle iron having a thickness of about one-half inch; and the cradle support assembly and the upright support member are each fabricated from iron plate materials having a thickness of about three-eighths inch.

It is clear that the present invention is well adapted to carry out the objects and to attain the ends and advantages mentioned herein, as well as those inherent within the present invention. While presently preferred embodiments of the invention have been described for purposes of this disclosure, numerous changes may be made which will readily suggest themselves to those skilled in the art and which are encompassed within the spirit and scope of the invention disclosed herein and as defined in the appended claims.

What is claimed is:

1. A safety support and stop assembly for securing a dump body pivotally mounted on a truck chassis frame in an elevated position above the chassis frame, the safety support and stop assembly positionable on the truck chassis frame when the dump body is in the elevated position, the safety support and stop assembly comprising:

(a) an angularly disposed upwardly extending support member having an upper body engaging support end and a lower pivot end;
   (b) cradle support means pivotally connected to the lower pivot end of the support member for supporting the support member in a selectable angular position relative to the truck chassis frame;
   (c) base means removably supported by the truck chassis frame and connected to the cradle support means for supporting the cradle support means at a selected position along the truck chassis frame; and
   (d) means connectable to the cradle support means so as to be positionable about a rearward portion of the truck chassis for stabilizing the base means on the truck chassis frame and thereby preventing sliding movement of the base means longitudinally along the supporting chassis frame as the dump body is lowered to supporting engagement with the upper body engaging end of the upright support member.

2. The safety support and stop assembly of claim 1 wherein a pair of such assemblies are positionable on the truck chassis frame in a parallel, spatially disposed position relative to one another, and wherein each of the assemblies further comprises:

means for connecting the base means of each of the safety and support assemblies together so as to stabilize the upright support members thereof on the chassis frame and for preventing lateral movement of the upright support members when the dump body is lowered to supporting engagement with the upper body engaging ends of the upright support members.

3. The safety support and stop assembly of claim 2 further comprising:

lock means connected to each of the cradle support means for lockingly engaging the upright support member pivotally connected to each of the cradle support means so as to secure each of the upright support members in the selectable angular disposition.

4. A safety support and stop assembly for securing a dump body pivotally mounted on a truck chassis frame above the chassis frame, the truck chassis frame having a plurality of parallel, longitudinal extending frame members and at least one cross member extending between the longitudinally extending frame members, the safety support and stop assembly comprising:

a first upright support member having an upper bed engaging support end and a lower pivot end;

first cradle support means pivotally connected to the lower pivot end of the first upright support member in a selected angular disposition;

first base means removably supported by one of the longitudinal frame members of the truck chassis frame for supporting the first cradle support means at a selected position on the longitudinal frame member such that the first upright support is angularly disposed and extensive in the direction of the pivotal connection of the dump bed to the truck chassis frame;

a second upright support member having an upper bed engaging support end and a lower pivot end;

second cradle support means pivotally connected to the lower pivot end of the second upright support member for supporting the second upright support member in a selected angular disposition;

second base means removably supported by a second longitudinal frame member of the truck chassis frame for supporting the second cradle support means at a selected position on the second longitudinal frame member such that the second upright support is substantially aligned with the first upright support and is angularly disposed and extensive in the direction of the pivotal connection of the dump bed to the truck chassis frame;

first connecting means for connecting the first and second base means in a predetermined spatial relationship on the longitudinal frame members of the truck chassis frame;

second connecting means connecting the first and second cradle means to the truck chassis frame for preventing movement of the first and second base members along the longitudinal frame members as the dump bed is lowered to an engaging position with the upper bed engaging support ends of the first and second upright support members;

a first collar member supported on the first base means;

a second collar member supported on the second base means, the second collar member having an aperture formed therein, the first and second collar members adapted to receive the first connecting means so as to connect the first and second base means and thereby stabilize the first and second upright support members when the dump body is lowered to supporting engagement with the upper body engaging ends of the first and second upright support members, the first connecting means comprising:

an elongated connecting member having a first end portion, an opposed second end portion, and a length greater than the distance between frame members supporting the first and second base means, the first end portion of the connecting member having at least one bore extending therethrough, the second end portion of the connecting member having a plurality of spatially disposed bores extending therethrough such that when the connecting member is positionable through the first and second collar members, the bore in the first end portion of the connecting member is alignable with the aperture in the second collar member and at least one bore in the opposed second end portion is disposed outwardly from the first collar member and in close proximity thereto;

first pin means positionable in the aligned aperture of the second collar member and the bore in the first end portion of the connecting member for connecting the first end portion of the connecting member to the second collar member; and second pin means positionable in the bore in the second end portion of the connecting member for connecting and securing the second end portion of the connecting member to the first collar member.

5. The safety support and stop assembly of claim 4 further comprising:

a first hook member connected to the first cradle support means; and a second hook member connected to the second cradle support means, the first and second hook members adapted to engage the second connecting means so as to cooperate with the second connecting means to stabilize the first and second cradle support means and prevent sliding movement of the first and second base means longitudinally along the supporting frame members when the dump body is lowered to supporting engagement with the upper body engaging ends of the first and second upright support members.

6. The safety support and stop assembly of claim 5 wherein the second connecting means comprises a chain element having a first end portion, a medial portion and an opposed second end portion, the first end portion connectable to the first hook member, the medial portion being disposed about the cross member of the chassis frame, and the second end portion connectable to the second hook member.

7. The safety support and stop assembly of claim 6 wherein the first and second base means are each substantially elongated L-shaped members.

8. The safety support and stop assembly of claim 7 wherein the first and second cradle support means each comprises:

a first upright plate member supported on the L-shaped member of the base means;

a parallel, spatially disposed second upright plate supported on the L-shaped member of the base means, the first and second upright plate members cooperating to define a cradle for the lower pivot end of one of the upright support members;

pivot means for connecting the lower pivot end of one of the upright support members such that the upright support member is pivotally connect to the first and second upright plates and selectively movable in a to and fro direction along the supporting frame member; and a retainer and stop plate connected to a rearwardly extending end of the first and second upright plates, the retainer and stop plate being angular disposed and adapted to engage the upright support and restrict its movement in a rearward direction.

9. The safety support and stop assembly of claim 8 further comprising:
   first lock means connected to the one of the upright plate members of the first cradle support means for engaging the first upright support member and for securing the first upright support member in the selectable angular disposition; and
   second lock means connected to one of the upright plate members of the second cradle support means for engaging the second upright support member and for securing the second upright support member in the selectable angular disposition.

10. The safety support and stop assembly of claim 9 wherein the first and second upright plates of each of the first and second cradle support means is provided with an aperture, the apertures of the first and second upright plates being axially aligned, and wherein the lower pivot end of each of the first and second upright support members has a substantially triangular configuration and is comprises of two parallel, spatially disposed side members, each of the side members forming the lower pivot end having an aperture therein which is axially alignable with the apertures in the first and second upright plates defining a cradle for the lower pivot end of the upright support member, and wherein the safety support and stop assembly further comprises:
   a reinforcing sleeve disposed between the two spatially disposed side walls forming the lower pivot end of each of the upright support member, the reinforcing sleeve being aligned with apertures in the side walls of the upright member; and
   pin means for connecting the lower pivot end of the upright support member to the first and second upright plates forming its cradle, the pin means positionable through the aligned apertures in the first and second upright plates, the aligned apertures in the side walls of the upright support member and the reinforcing sleeve so as to effect the pivotal attachment of the upright support member to the cradle support means.

* * * * *